United States Patent
Roszinski et al.

[15] 3,671,612
[45] June 20, 1972

[54] PROCESS FOR THE MANUFACTURE OF AMMONIUM DIALKYLDITHIOPHOSPHATES

[72] Inventors: Hilmar Roszinski, Kendenich near Cologne; Heinz Harnisch, Loevenich near Cologne, both of Germany

[73] Assignee: Knapsack Aktiengesellschaft, Koln, Germany

[22] Filed: March 21, 1969

[21] Appl. No.: 809,408

[30] Foreign Application Priority Data

April 5, 1968 Germany..................P 17 68 151.5

[52] U.S. Cl..............................260/987, 260/963
[51] Int. Cl............................................C07f 9/16
[58] Field of Search....................................260/987

[56] References Cited

UNITED STATES PATENTS 2,373,811  4/1945  Cook et al..........................260/987 X Primary Examiner—Lewis Gotts
Assistant Examiner—Anton H. Sutto
Attorney—Connolly and Hutz

[57] ABSTRACT

Production of noncaking ammonium dialkyldithiophosphates of the general formula:

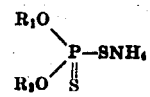

in which $R_1$ and $R_2$ represent identical or different alkyl radicals having from one to six carbon atoms. The phosphates are produced by mixing dialkyldithiophosphoric acids with an alcohol in a molar ratio of smaller than 1:0.25, introducing gaseous ammonia into the resulting mixture, filtering off precipitated salt, washing the salt and drying it.

7 Claims, No Drawings

PROCESS FOR THE MANUFACTURE OF AMMONIUM DIALKYLDITHIOPHOSPHATES

The present invention relates to a process for the manufacture of ammonium-dialkyldithiophosphates of the general formula:

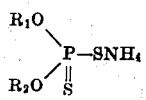

in which $R_1$ and $R_2$ represent identical or different alkyl radicals having from one to six carbon atoms therein.

It is known that dialkyldithiophosphoric acids can be produced by reaction of phosphorus pentasulfide with alcohols, and that the salts of these acids can be obtained by neutralization. With reference to the various cations, it is known that various dialkyldithiophosphoric acid salt-production methods have been described in literature. However, none of these earlier processes can be used for the production of noncaking ammonium salts of the above acids, from nonaqueous solutions.

All conditions which initially appear to be quite suggestive for reaction of dialkyldithiophosphoric acids with ammonia in an inert solvent produce ammonium salts that are very pure, yet cake together to hard lumps, all this without the ammonium salts being hydroscopic or having a remarkably changed chemical nature. The poor stability to storage of such hard material may jeopardize its further use, or considerably restrict the normally widespread chemical applicability of dialkyldithiophosphoric acids, especially in those cases which necessitate shipment of the material.

The present invention now unexpectedly provides a process for the manufacture of noncaking ammonium dialkyldithiophosphates of the general formula given hereinabove, which comprises mixing the dialkyldithiophosphoric acids with an alcohol in a molar ratio of dialkyldithiophosphoric acid/alcohol of smaller than 1:0.25, preferably 1:0.3 to 1:0.5, introducing into the resulting mixture a maximum of 1.10 mols, preferably 1.00 to 1.02 mols, gaseous ammonia, per mol dialkyldithiophosphoric acid, filtering off precipitated salt, washing the salt and drying it.

The alcohols suitable for use in the present process include aliphatic alcohols having from one to six carbon atoms, which can be used singly or in combination, and preferably include those alcohols which correspond to the $R_1$ and/or $R_2$-alkyl radicals in the dialkyldithiophosphoric acids used.

After having been filtered and washed, the salt is dried at temperatures between 15° and 110° C., preferably while using a stream of air with a temperature between 20° and 50°C.

The mixture of dialkyldithiophosphoric acid and alcohol is advantageously used in combination with an inert solvent including aliphatic and/or aromatic hydrocarbons having from five to eight carbon atoms, or carbon tetrachloride. Cyclohexane, toluene or benzene may more especially be used to that effect. The solvent should be used in quantities such that the maximum ratio of solvent volume to volume of the dialkyldithiophosphoric acid/alcohol mixture is 5:1, preferably about 1:1.

As can readily be seen under the microscope, the ammonium dimethyldithiophosphate, for example, is precipitated in the present process in the form of coarse crystals, which appear to have a hexagonal shape, rather than in the form of fine needles. X-ray investigation has shown that the change of the crystalline form entrains no change of the inner crystalline structure. In order to change the crystalline form, it is necessary for the dialkyldithiophosphoric acid/alcohol mixture to be present in the above ratio at the onset of the precipitating step. While no crystal form change similar to that produced in ammonium dimethyldithiophosphate occurs in the further ammonium-dialkyldithiophosphates during precipitation, the fact remains that this ratio enables the production of noncaking ammonium-dialkyldithiophosphates. The precipitation with the use of an alcohol/dialkyldithiophosphoric acid-ratio greater than that indicated above or with the use of even pure alcohol, which fails to improve the quality of the resulting products, is an uneconomic procedure because of rapidly increasing salt loss.

It is equally imperative for the ammonia neutralization of the dialkyldithiophosphoric acids to be carried out in the absence of any excess ammonia as the salts dissolve therein and are rendered glutinous once ammonia and acid are used in a molar ratio of $>1.02$.

The salts so precipitated, which are filtered and washed, should be dried under mild conditions so as to obviate even slight decomposition thereof, which again results in the formation of glutinous products. The drying step is best achieved using a stream of warm air. The working examples described hereinafter were carried out with the use of a vacuum suction filter and warm air was suction-drawn through the washed filter cake.

The products obtained by the present process fail to cake together even after prolonged storage. They are nonhygroscopic and having a purity very good for this class of compounds.

The following examples illustrate the invention.

EXAMPLE 1

1 Mol (158 grams) crude dimethyldithiophosphoric acid was diluted with 130 milliliters toluene. 18 Grams methanol were added to the acid/toluene-mixture so produced and 1 mol (17 grams) gaseous ammonia was introduced thereinto within 4 hours, at 21° C., with thorough agitation and cooling. The resulting ammonium dimethyldithiophosphate was separated from the solution having the impurities therein, by means of a vacuum suction filter. The filter cake was washed using 100 milliliters toluene. The white, coarsely crystalline salt so ob-tained was dried within 5 hours by suction-drawing air of 30° C. therethrough. The resulting product has a purity of 99 percent and was obtained in a yield of 150 grams. The salt was stored for a period of more than 2 months without caking together.

EXAMPLE 2

1 Mol (158 grams) crude dimethyldithiophosphoric acid was diluted with 130 milliliters carbon tetrachloride. 16 Grams methanol were added to the acid/carbon tetrachloride-mixture so produced and 1 mol (17 grams) gaseous ammonia was introduced thereinto within 2 hours with thorough agitation and cooling down to 30° C. The resulting ammonium dimethyldithiophosphate was separated from the solution having the impurities therein, by means of a vacuum suction filter. The filter cake was washed using 50 milliliters carbon tetrachloride and 50 milliliters cyclohexane. The while, coarsely crystalline salt so obtained was dried within 5 hours by suction-drawing air of 30° C. therethrough. The resulting product had a purity of 98.2 percent and was obtained in a yield of 85.2 percent. The salt was stored for a period of more than 2 months without caking together.

EXAMPLE 3

1 Mol (186 grams) crude diethyldithiophosphoric acid was diluted with 150 milliliters toluene. 20 Grams ethanol were added to the acid/toluene-mixture so produced and 1 mol (17 grams) gaseous ammonia was introduced thereinto within 2 hours, at 21° C., with thorough agitation and cooling. The resulting ammonium diethyldithiophosphate was separated from the solution having the impurities therein, by means of a vacuum suction filter. The filter cake was washed using 100 milliliters toluene. The white, crystalline salt so produced was dried within 4 hours by suction-drawing air of 40° C. therethrough. The resulting product had a purity of 99.5 percent and was obtained in a yield of 188 grams. The salt was stored for a period of more than 4 months without caking together.

EXAMPLE 4

1 Mol (242 grams) crude di-sec.-butyldithiophosphoric acid was diluted with 150 milliliters toluene. 25 Grams secondary butanol were added to the acid/toluene-mixture so produced and 1 mol (17 grams) gaseous ammonia was introduced thereinto within 2 hours, at 21° C., with thorough agitation and cooling. The resulting ammonium di-sec.-butyl-dithiophosphate was separated from the solution having the impurities therein, by means of a vacuum suction filter. The filter cake was washed using 100 milliliters benzene. The white, crystalline salt so produced was dried within 3 hours by suction-drawing air of 40° C. therethrough. The resulting product had a purity of 99.1 percent and was obtained in a yield of 248 grams. The salt was stored for a period of more than 4 months without caking together.

We claim:

1. A process for the manufacture of ammonium dialkyl-dithiophosphates of the general formula

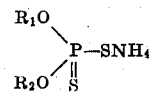

in which $R_1$ and $R_2$ represent identical or different alkyl radicals having from one to six carbon atoms, which comprises mixing dialkyldithiophosphoric acids with an inert solvent selected from the group consisting of carbon tetrachloride, cyclohexane and aliphatic or aromatic hydrocarbons having five to eight carbon atoms and an alcohol or a mixture of alcohols corresponding to the $R_1$ and $R_2$-alkyl radicals in the dialkyldithiophosphoric acids in a molar ratio of dialkyldithiophosphoric acid/alcohol of smaller than 1:0.25, introducing into the resulting mixture a maximum of 1.10 mols gaseous ammonia per mol dialkyldithiophosphoric acid, filtering off precipitated salt, washing the salt and drying it.

2. The process of claim 1, which comprises mixing the dialkyldithiophosphoric acids with the alcohol in a molar ratio between 1:0.3 and 1:0.5.

3. The process of claim 1, which comprises introducing into the said mixture between 1.00 and 1.02 mol ammonia, per mol dialkyldithiophosphoric acid.

4. The process of claim 1, wherein the filtered and washed salt is dried at temperatures between 15° and 110° C.

5. The process of claim 4, wherein the washed salt is dried using a stream of air with a temperature between 20° and 50°C.

6. The process of claim 1, wherein the maximum ratio of solvent volume to volume of the dialkyldithiophosphoric acid/alcohol-mixture is 5:1.

7. The process of claim 6, wherein the ratio of solvent volume to volume of the dialkyldithiophosphoric acid/alcohol-mixture is about 1:1.

* * * * *